(12) United States Patent
Chatterjee et al.

(10) Patent No.: US 8,255,660 B1
(45) Date of Patent: *Aug. 28, 2012

(54) DATA MIGRATION BETWEEN MULTIPLE TIERS IN A STORAGE SYSTEM USING PIVOT TABLES

(75) Inventors: Paresh Chatterjee, Fremont, CA (US); Ajit Narayanan, Chennai (IN); Loganathan Ranganathan, Fremont, CA (US); Sharon Enoch, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,432

(22) Filed: Aug. 22, 2011

Related U.S. Application Data

(63) Continuation of application No. 12/101,238, filed on Apr. 11, 2008, now Pat. No. 8,006,061.

(60) Provisional application No. 60/923,224, filed on Apr. 13, 2007.

(51) Int. Cl.
*G06F 12/00* (2006.01)
(52) U.S. Cl. .................................. 711/170; 711/173
(58) Field of Classification Search .................. 711/170
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,502,836 A | 3/1996 | Hale et al. | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,275,898 B1 | 8/2001 | DeKoning | |
| 6,289,398 B1 | 9/2001 | Stallmo et al. | |
| 6,327,638 B1 | 12/2001 | Kirby | |
| 6,484,235 B1 | 11/2002 | Horst et al. | |
| 6,718,436 B2 | 4/2004 | Kim et al. | |
| 6,901,479 B2 | 5/2005 | Tomita | |
| 7,360,051 B2 | 4/2008 | Sugino et al. | |
| 7,404,102 B2 | 7/2008 | Soran et al. | |

(Continued)

OTHER PUBLICATIONS

U.S. Appl. No. 13/209,854, filed Aug. 15, 2011, entitled "Networked Raid in a Virtualized Cluster," Inventors: Chatterjee et al.

(Continued)

*Primary Examiner* — Tuan Thai
*Assistant Examiner* — Ngoc Dinh
(74) *Attorney, Agent, or Firm* — McKeon, Meunier, Carlin & Curfman, LLC

(57) ABSTRACT

Technologies are described for implementing a migration mechanism in a data storage system containing multiple tiers of storage with each tier having different cost and performance parameters. Access statistics can be collected for each territory, or storage entity, within the storage system. Data that is accessed more frequently can be migrated toward higher performance storage tiers while data that is accessed less frequently can be migrated towards lower performance storage tiers. Each tier can be associated with a range of ILM statistics referred to as the bucket for that tier. A pivot table may be provided that relates the tiers and the buckets. Operations on the pivot table can provide counts of how many territories may be promoted or demoted between any two pairs of tiers.

16 Claims, 11 Drawing Sheets

U.S. PATENT DOCUMENTS

| | | | |
|---|---|---|---|
| 7,536,529 | B1 | 5/2009 | Chatterjee et al. |
| 7,549,027 | B1 | 6/2009 | McAndrews et al. |
| 7,562,200 | B1 | 7/2009 | Chatterjee et al. |
| 7,590,664 | B2 | 9/2009 | Kamohara et al. |
| 7,698,503 | B2 | 4/2010 | Okada et al. |
| 7,730,531 | B2 | 6/2010 | Walsh |
| 7,774,572 | B2 | 8/2010 | Yokohata et al. |
| 2002/0161983 | A1 | 10/2002 | Milos et al. |
| 2003/0163630 | A1 | 8/2003 | Aasheim et al. |
| 2004/0255189 | A1 | 12/2004 | Chu et al. |
| 2005/0055402 | A1 | 3/2005 | Sato |
| 2005/0165925 | A1 | 7/2005 | Dan et al. |
| 2005/0182910 | A1 | 8/2005 | Stager et al. |
| 2005/0188075 | A1 | 8/2005 | Dias et al. |
| 2006/0031648 | A1 | 2/2006 | Ishikawa et al. |
| 2006/0031649 | A1 | 2/2006 | Murotani et al. |
| 2006/0107013 | A1 | 5/2006 | Ripberger |
| 2006/0130042 | A1 | 6/2006 | Dias et al. |
| 2006/0243056 | A1 | 11/2006 | Sundermeyer et al. |
| 2006/0248273 | A1 | 11/2006 | Jernigan et al. |
| 2007/0083567 | A1 | 4/2007 | Arai et al. |
| 2007/0112894 | A1 | 5/2007 | Okada |
| 2007/0198604 | A1 | 8/2007 | Okada et al. |
| 2008/0027998 | A1 | 1/2008 | Hara |
| 2008/0071841 | A1 | 3/2008 | Okada et al. |
| 2008/0071842 | A1 | 3/2008 | Tokuda et al. |
| 2008/0091744 | A1 | 4/2008 | Shitomi et al. |
| 2008/0104343 | A1* | 5/2008 | Miyagaki et al. ............. 711/158 |
| 2008/0154914 | A1 | 6/2008 | Kan et al. |
| 2008/0162662 | A1 | 7/2008 | Fujita et al. |
| 2008/0320247 | A1 | 12/2008 | Morfey et al. |
| 2009/0070541 | A1* | 3/2009 | Yochai .......................... 711/165 |

OTHER PUBLICATIONS

U.S. Official Action dated Sep. 29, 2011 in U.S. Appl. No. 13/209,854.

U.S. Appl. No. 12/425,123, filed Apr. 16, 2009, entitled "Provisioning Space in a Data Storage System," Inventors: Chatterjee et al.

U.S. Official Action dated Dec. 20, 2010 in U.S. Appl. No. 12/425,123.

U.S. Official Action dated Jun. 22, 2010 in U.S. Appl. No. 12/425,123.

U.S. Appl. No. 12/104,135, filed Apr. 16, 2008, entitled "Container Space Management in a Data Storage System," Inventors: Chatterjee et al.

U.S. Official Action dated Apr. 11, 2011 in U.S. Appl. No. 12/104,135.

U.S. Official Action dated Oct. 28, 2010 in U.S. Appl. No. 12/104,135.

U.S. Appl. No. 12/104,123, filed Apr. 16, 2008, entitled "Networked Raid in a Virtualized Cluster," Inventors: Chatterjee et al.

U.S. Notice of Allowance / Allowability dated Apr. 1, 2011 in U.S. Appl. No. 12/104,123.

U.S. Official Action dated Dec. 2, 2010 in U.S. Appl. No. 12/104,123.

U.S. Appl. No. 12/101,251, filed Apr. 11, 2008, entitled "Allocating Background Workflows in a Data Storage System Using Historical Data," Inventors: Chatterjee et al.

U.S. Notice of Allowance / Allowability dated May 13, 2011 in U.S. Appl. No. 12/101,251.

U.S. Official Action dated Jan. 25, 2011 in U.S. Appl. No. 12/101,251.

U.S. Appl. No. 12/101,238, filed Apr. 11, 2008, entitled "Data Migration Between Multiple Tiers in a Storage System Using Pivot Tables," Inventors: Chatterjee et al.

U.S. Notice of Allowance / Allowability dated Apr. 15, 2011 in U.S. Appl. No. 12/101,238.

U.S. Official Action dated Nov. 5, 2010 in U.S. Appl. No. 12/101,238.

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Official Action dated May 5, 2011 in U.S. Appl. No. 12/101,236.

U.S. Official Action dated Dec. 22, 2010 in U.S. Appl. No. 12/101,236.

U.S. Appl. No. 12/101,241, filed Apr. 11, 2008, entitled "Allocating Background Workflows in a Data Storage System Using Autocorrelation," Inventors: Chatterjee et al.

U.S. Notice of Allowance / Allowability dated Nov. 10, 2011 in U.S. Appl. No. 12/101,241.

U.S. Official Action dated Jan. 21, 2011 in U.S. Appl. No. 12/101,241.

Burtscher, Martin et al., "Prediction Outcome History-based Confidence Estimation for Load Value Prediction," Department of Computer Science, University of Colorado, Journal of Instruction-Level Parallelism 1, May 1999, pp. 1-25.

U.S. Appl. No. 11/417,801, filed May 4, 2006, entitled "Method, System, and Apparatus for Expanding Storage Capacity in a Data Storage System," Inventors: Chatterjee et al.

U.S. Notice of Allowance / Allowability dated Jan. 26, 2010 in U.S. Appl. No. 11/417,801.

U.S. Official Action dated Jul. 8, 2009 in U.S. Appl. No. 11/417,801.

U.S. Appl. No. 11/254,347, filed Oct. 20, 2005, entitled "Method, System, Apparatus, and Computer-Readable Medium for Provisioning Space in a Data Storage System," Inventors: Chatterjee et al.

U.S. Notice of Allowance / Allowability dated Jan. 12, 2009 in U.S. Appl. No. 11/254,347.

U.S. Official Action dated Oct. 8, 2008 in U.S. Appl. No. 11/254,347.

U.S. Official Action dated Mar. 18, 2008 in U.S. Appl. No. 11/254,347.

U.S. Official Action dated Sep. 4, 2007 in U.S. Appl. No. 11/254,347.

* cited by examiner

| BUCKET NO. | BUCKET START | BUCKET END |
|---|---|---|
| 0 [FREE] | -32768 | -32768 |
| 1 | 0 | 32767 |
| 2 | -8191 | -1 |
| 3 | -16383 | -8192 |
| 4 | -24575 | -16384 |
| 5 | -32767 | -24576 |

*Fig. 3*

|        | BUCKET 0 | BUCKET 1 | BUCKET 2 | BUCKET 3 | BUCKET 4 | BUCKET 5 |
|--------|----------|----------|----------|----------|----------|----------|
| TIER 1 | 50       | 200      | 100      | 50       | 60       | 10       |
| TIER 2 | 100      | 100      | 300      | 200      | 100      | 100      |
| TIER 3 | 500      | 50       | 200      | 600      | 700      | 0        |
| TIER 4 | 1000     | 20       | 30       | 50       | 100      | 100      |
| TIER 5 | 700      | 30       | 60       | 100      | 200      | 900      |

*Fig. 4*

| | NUMBER OF PROMOTIONS |
|---|---|
| TIER 1 | 50 |
| TIER 2 | 100 |
| TIER 3 | 150 |
| TIER 4 | 200 |
| TIER 5 | [NOT APPLICABLE] |

DATA MIGRATION BETWEEN MULTIPLE TIERS IN A STORAGE SYSTEM USING PIVOT TABLES

CROSS-REFERENCE TO RELATED APPLICATIONS

This application is a continuation of U.S. patent application Ser. No. 12/101,238 now U.S. Pat. No. 8,006,061, filed on Apr. 11, 2008, and entitled "Data Migration Between Multiple Tiers in a Storage System Using Pivot Tables," and claims the benefit of U.S. provisional patent application No. 60/923,224, filed on Apr. 13, 2007, and entitled "Novel Method of Choosing Data to Migrate Between Multiple Tiers in a Storage System Using Pivot Tables," the disclosure of which are expressly incorporated herein by reference in their entireties.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to collection of disks in a Redundant Array of Inexpensive Disks (RAID) configuration, since a virtualized cluster hides the internal details of the cluster's operation from initiators and presents a unified device instead.

In a virtualized cluster, which may have huge amounts of storage, the drives and RAID arrays constituting the storage hardware may not be homogeneous. A combination of less expensive, slower drives and more expensive, faster drives are often used together to achieve a desired mix of performance and price. Such a homogeneous storage system consists, therefore, of a plurality of sets of physical disks or logical disks, each set having different cost and performance parameters. Determining how the data being stored in the system should best be distributed among the various drives presents an interesting challenge. Generally, two major considerations play into making such a determination. These considerations are performance maximization and utilization maximization of the most costly resources.

Just as the disk and logical disk components of a storage system may not be homogeneous, data accesses in the system may not be homogeneous. Generally, certain data may be accessed very frequently while other data may be hardly ever accessed. Moreover, some data may have been accessed frequently at some point in time, but has recently been accessed less frequently. It is typically desirable to host data that is accessed more frequently on the higher cost, higher performance storage devices. Conversely, data that is less frequently accessed may be relegated to the lower cost, lower performance storage devices. Such an arrangement may provide a storage system that puts the most costly resources to their highest and best use.

Migrating blocks of stored data to different storage areas over time can assist with placing the most used data on the highest performance storage components. Determining which data should be migrated to what storage areas and at what time can provide a difficult optimization challenge. This challenge is further complicated by the fact that data access patterns may change over time and are generally not static.

It is with respect to these considerations and others that the disclosure made herein is presented.

SUMMARY

Technologies are described herein for implementing a migration mechanism in a storage system containing multiple tiers of storage with each tier having different cost and performance parameters. Through the utilization of the technologies and concepts presented herein, data that is accessed more frequently can be migrated toward higher cost, higher performance storage tiers while data that is accessed less frequently can be migrated towards lower cost, lower performance storage tiers. Migrating data can involve relocating all of a subdivision of data from a source tier to a destination tier. A dynamic, adaptive approach to data migration can provide a highly optimized arrangement of data even under changing data access conditions.

The physical capacity within a storage system can be partitioned such that each partition can have different cost and performance parameters related to the underlying drives and hardware. These partitions can be referred to as the tiers of the storage system. A storage system with more than one tier can be referred to as tiered storage.

Storage capacity within a storage system can be allocated as units referred to as territories. Information Lifecycle Management (ILM) statistics can be collected for each territory within the storage system. Examples of ILM statistics that can be maintained for each territory may include frequency of access and age, or time since the last access of the territory.

According to one embodiment presented herein, each tier can be associated with a range of ILM statistics. The non-overlapping range of ILM values assigned to a particular tier may be referred to as the bucket for that tier. Taken together, all the tiers can completely cover the entire range of ILM values. The actual ILM metric values of the territories within a given tier may be inside or outside of the bucket range associated with that tier. If the ILM value of a territory is outside of the bucket range for the tier where that territory currently resides, the territory may become a candidate for migration. A special bucket, or free bucket, may be provided for territories that are currently not allocated.

According to another embodiment, a pivot table may be provided that relates the tiers and the buckets. Operations on the pivot table can provide counts of how many territories may be promoted or demoted between any two pairs of tiers. Within a particular pair of tiers, the territories with the highest ILM statistics in the lower tier may be promoted, while the territories with the lowest ILM statistics in the higher tier may be demoted. Such data migration can move a storage system towards a more optimized arrangement of data where data with the highest access frequency can be placed on the highest performance storage resources. The data migration scheme may also contribute to maintaining more optimized data arrangements as data usage and system resource change over time.

According to yet another embodiment, a fixed number of territories can be reserved on each tier for the purpose of promoting and demoting territories. These reserved territories can support promotion and demotion between tiers without running out of space. Such territories may be reserved and thus not used for normal I/O operations.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a data structure diagram illustrating a set of ILM statistic ranges for the buckets of a multitier data storage system according to one exemplary embodiment;

FIG. 4 is a data structure diagram illustrating a pivot table representing quantities of territories within buckets and storage tiers in a data storage system according to one exemplary embodiment;

FIG. 5 is a data structure diagram illustrating the number of promotion to be migrated into each tier of a data storage system according to one exemplary embodiment;

DETAILED DESCRIPTION

Figure 1:
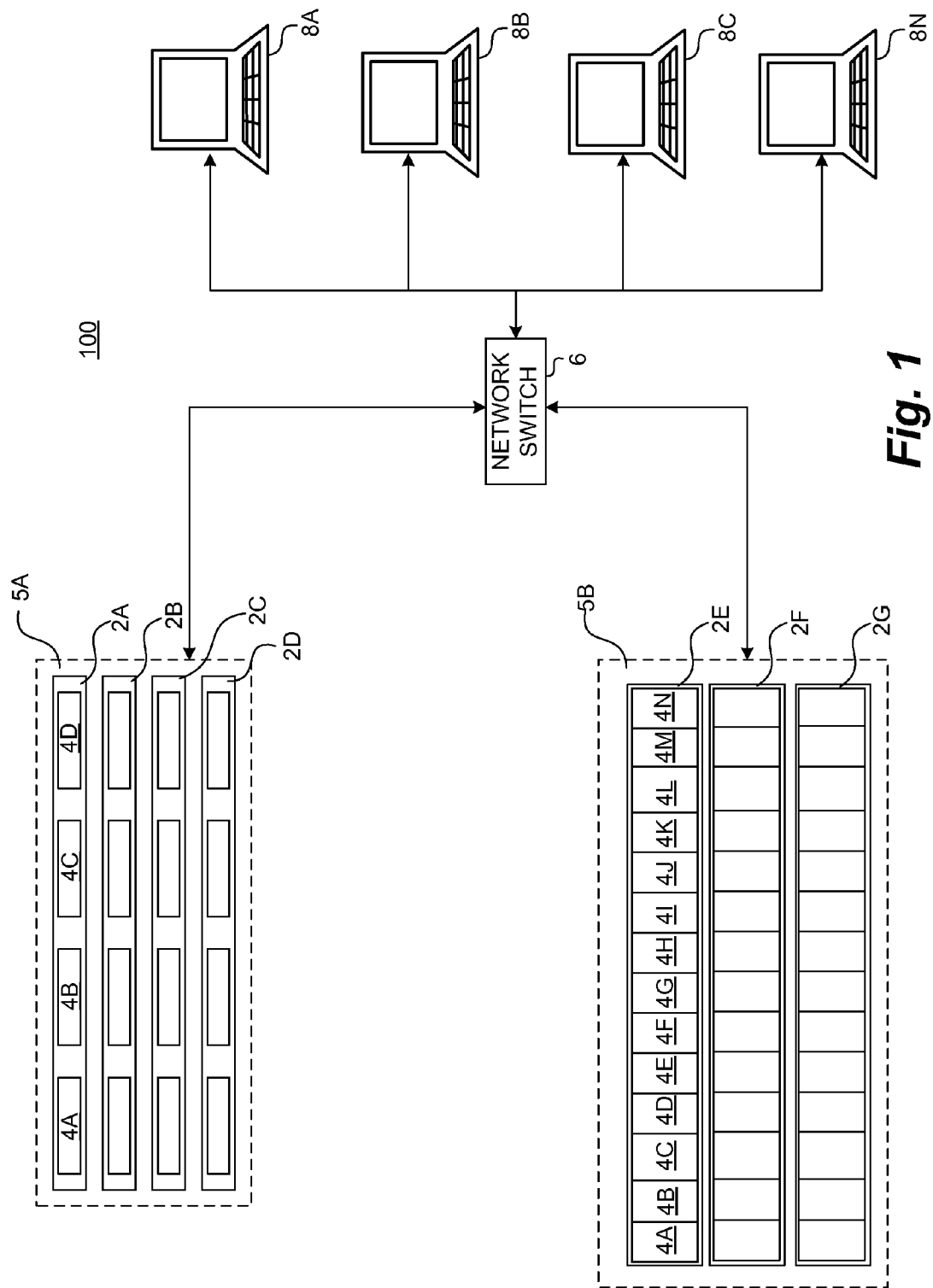
FIG. 1 is a network architecture diagram illustrating aspects of a storage system that includes several virtualized clusters according to one exemplary embodiment.

The following detailed description is directed to implementing data migration in a multitier storage system using pivot tables. Through the use of the embodiments presented herein, data that is accessed more frequently can be migrated toward higher cost, higher performance storage tiers while data that is accessed less frequently can be migrated towards lower cost, lower performance storage tiers. A dynamic, adaptive approach can maintain efficient data arrangements amongst the tiers of the storage system even under changing data access conditions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing data migration in a multitier storage system using age and frequency statistics will be described.

Turning now to FIG. 1, details will be provided regarding an illustrative operating environment for the implementations presented herein, as well as aspects of several software components that provide the functionality described herein for implementing data migration in a multitier storage system using age and frequency statistics. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
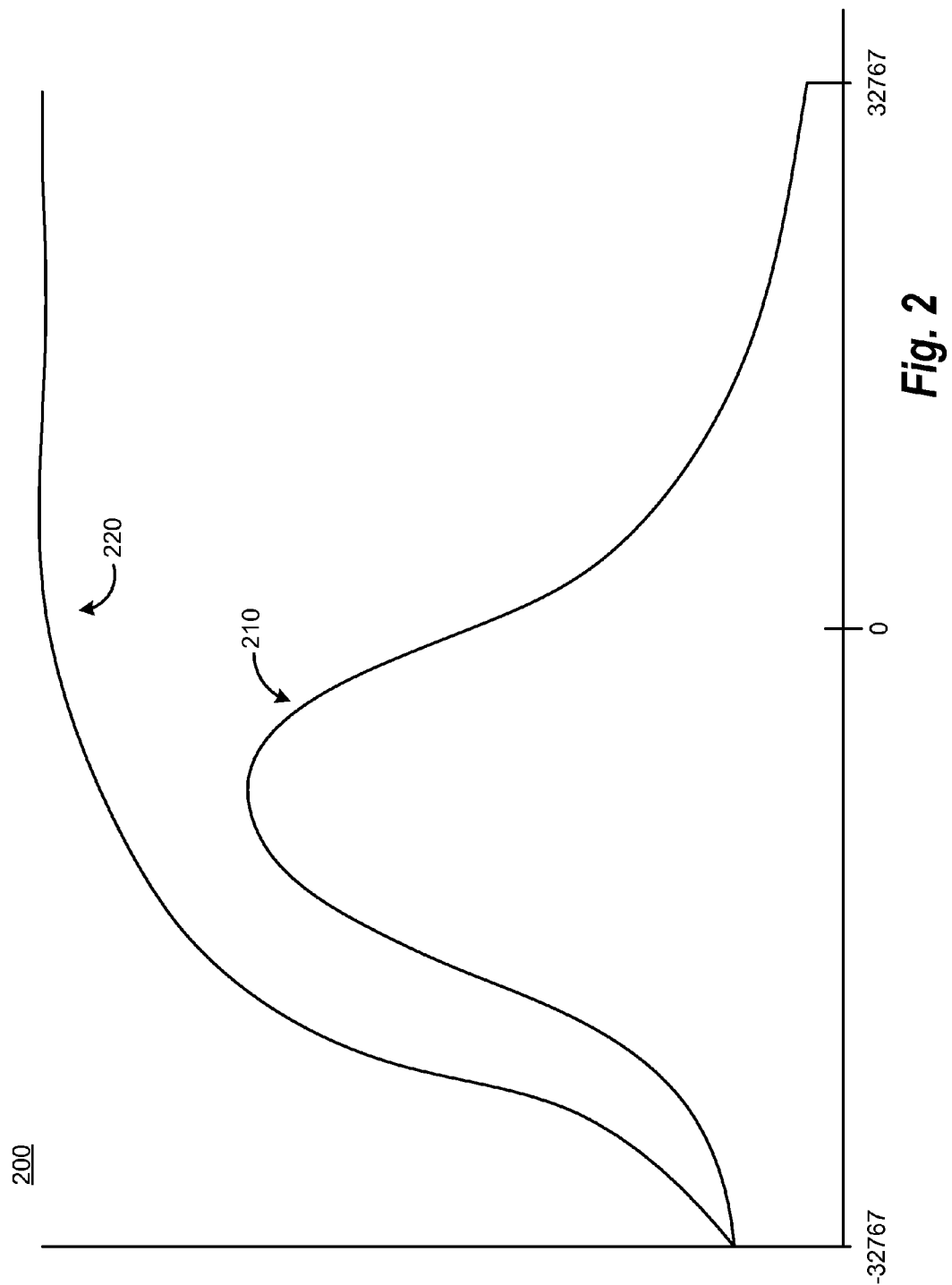
FIG. 2 is a statistical distribution plot illustrating a probability distribution of access statistics within a storage system as well as an associated cumulative distribution function according to one exemplary embodiment.

Referring now to FIG. 2, a statistical distribution plot 200 illustrates the probability distribution 210 of access statistics within a storage system as well as the associated cumulative distribution function (CDF) 220. The horizontal axis of the plot 200 covers an example range of ILM statistic values. The probability distribution curve 210 illustrates the distribution of territories over the range of ILM statistic values. For example, the probability distribution curve 210 peaks near an ILM statistic value of about negative ten thousand. The probability distribution curve 210 is considerably lower at the ILM statistic value of zero and much lower still at the highest ILM statistic value of thirty thousand. This can imply that there are a much larger number of territories within the storage system having ILM metrics near negative ten thousand than there are territories having ILM metrics near zero. There may be even fewer territories with ILM metrics near thirty thousand. In practice, data representing a probability distribution curve 210 can be measured by making a histogram. For example, each territory in the system can be examined and each time a certain ILM value is observed, the histogram can be increased by one for that value. Eventually, the histogram can represent how many territories have each ILM value, similar to the probability distribution curve 210.

The CDF plot 220 is a cumulative representation of the probability distribution curve 210. The CDF plot 220 can also be described, at each point, as the integral of the probability distribution curve 210 from its negative limit up to that point. For example, the CDF 220 at zero is the number of territories having ILM metrics less than or equal to zero. The CDF at 32,767 is the number of all territories since all territories have an ILM value less than or equal to 32,767.

It should be appreciated that the shape of the curves 210, 220 in the plot 200 are only an example and will vary from case to case, and even over time within a single case, according to embodiments. Such changes may depend upon the nature and timing of I/O loads on the storage system and various system characteristics such as network bandwidth, network hardware, storage drive characteristics, RAID controllers, cache, memory, CPU cycles, and so on.

The ILM values for each territory can be collected by the storage system to determine how frequently a territory is accessed. A periodic ILM statistic update timer may be used. If a territory was accessed during the last update period, a frequency statistic can be incremented each time the territory is accessed. At the end of an update period, the frequency statistic can represent the number of accesses during that update period. If a territory was not accessed during the last update period, an age statistic may be incremented to indicate that is has been a longer time since the territory was accessed. A combined single variable can be used as an ILM metric that can represent both the frequency statistic and the age statistic within one value. The frequency statistic and the age statistic may be considered mutually exclusive since the frequency statistic may be irrelevant for a territory with a higher age, and the age statistic may be taken as zero, or nearly zero, for a frequently accessed territory. Thus only one of the frequency or the age may need to be stored for a given territory.

A sign bit, or the most significant bit, of the ILM metric may be used to indicate whether the ILM metric is currently an age or a frequency. The ILM metric can represent a signed value, which can be negative when it represents an age and positive when it represents a frequency. A larger positive number can imply a higher frequency of access than a lower positive number, while a lower (or more negative) negative number can imply an older age then a smaller negative number. Thus a consistent continuum across the positive and negative ILM metric values can represent a consistent ordering. This order maps to both most recently and most frequently accessed territories having higher ILM metric values than older or less frequently used territories.

An example of implementing the ILM metric values is to use a 16 bit word to store the ILM metric. To remove ambiguity, unused territories or newly initialized ILM metrics may be given the unique value, for example one with all bits set high. This number will not be used in the normal age or frequency counting operations in order to maintain its unique meaning in an unambiguous manner. Other than this reserved identifier, the high bit (or sign bit) can be used to designate age or frequency such that ages are negative and frequencies are positive. The remaining fifteen bits can be used to count the age and/or frequency accordingly. This results in $2^{15}$ possible values with one being subtracted for the 0xFFFF reserved identifier for unused territories. Given the sign bit, these same value ranges can be both positive and negative for a range from negative ($2^{15}-1$) to positive ($2^{15}-1$) which is equal to the range of $-32,767$ to $+32,767$ as shown on the horizontal axis of the plot 200. These values are examples according to one embodiment and it should be appreciated that other ranges may be used without departing from the scope or spirit of the technologies disclosed herein.

Referring now to FIG. 3, a data structure diagram 300 illustrates the ILM statistic ranges for the buckets of a multi-tier storage system. The data structure 300 can relate each bucket number 310 with the range of ILM values that have been assigned to that bucket. The range of ILM values can span from a bucket start value 320 to a bucket end value 330 and can include both of those values. Taken together, all of the bucket ranges can completely cover the entire range of ILM values for the storage system such that the buckets define a partitioning of the ILM value range. The partition imposed by the buckets can identify which bucket any given territory may be migrated to based upon the ILM statistics for that territory.

Each bucket can be associated with a tier of the storage system and the bucket numbers 310 can correspond to the associated tier numbers. Additionally, a special bucket may be provided for territories that are free, or currently not allocated. This special bucket can be labeled as bucket number zero. The data structure 300 shows an example allocation of ILM values to a system with five tiers and thus five buckets. The example shows an arrangement where all data that has been accessed within the last ILM statistics update period, for example one hour, can be targeted for tier number one. This is shown by bucket number one having an ILM value bucket range of 0 to 32,767, or all positive ILM values. Such an arrangement can work well for storage systems with a smaller number of tiers, for example two to four tiers depending upon the data access statistics of the system. Other allocation of ILM ranges to buckets may be used included automatic adaptive approaches.

The actual ILM metric values of the territories within a given tier may be inside or outside of the bucket range associated with that tier. If the ILM value of a territory is outside of the bucket range for the tier where that territory currently resides, the territory may become a candidate for migration. Migrating data can involve relocating all of the data in a given territory from a source tier to a destination tier. While smaller territories may provide a finer granularity of statistics and quicker migrations, larger territories may provide a reduced memory/storage footprint for the collected ILM statistics. A tradeoff between these two constraints may yield an optimal territory size for different applications or systems. For example, one embodiment may use a territory size of eight megabytes.

The zero bucket, or unallocated bucket, can contain territories with the reserved ILM value for unallocated territories. For example, 0xFFFF (all 16 bits set high) may be used to indicate unallocated territories. The hexadecimal value 0xFFFF can equal negative 32,768 in signed decimal. As such, both the bucket start value 320 and the bucket end value 330 can be negative 32,768 for bucket number zero.

The bucket partitioning for a storage system can be established by examining a histogram or probability distribution 210 of access statistics within the storage system. For example, the maximum value of the CDF curve 220 illustrates the number of territories in the whole storage system. If the physical storage in the first tier can support 2000 territories, and ten percent slack space is desired, the first 1800 territories off of the top of the CDF curve 220 can be allocated to bucket one. The number 1800 is 90% of the full 2000 territory capacity to leave 10% of the tier capacity remaining as slack space. Moving a quantity of 1800 down the CDF curve 220 and determining the ILM value (horizontal axis of plot 200) for that point can provide the bucket start value 320 for bucket one. The bucket end value 330 for bucket one can be 32,767 or whatever the highest value in the ILM range is for the given system. Next, the bucket end value 330 for bucket two can simply be one less than the bucket start value 320 for bucket one. If the physical capacity for tier two, for example, supports 6000 territories, the ILM range values for bucket two can be based on 5400 (90% of 6000) territories off of the CDF curve 220. This process can continue down the tiers, using the capacity of a tier to determine the ILM range for the corresponding bucket by examining the CDF curve 220. Starting off the top of the collected access data with tier one can support the placement of the most data into the highest performing tiers.

The specification for a minimum of ten percent slack space in each tier can support working room for promotions and demotions. It can also support the placement of newly allocated data into the highest tier available. The value of ten percent is merely an example, and other values may be used. Each tier may be designed to save the same percentage of slack space, or the same fixed number of slack territories, or any combination thereof. Also, each tier may have different percentages or different fixed amounts of slack space reserved, according to embodiments. A certain number of territories in each tier may also be reserved for promotions and demotions only and never be actually used for fixed storing of data territories. As new data allocations are placed in the highest tier (tier one), territories in tier one may need to be demoted down into tier two, and other territories from tier two into tier three, and so on. The periodic adjustment of the bucket limits and the periodic updating the ILM statistics for each territory can allow the storage system to dynamically adjust as needed. The periods for updating the ILM statistics for each territory and the period for recalculating the ILM value ranges for each bucket need not be the same. Nor does the period for the periodic migration of data territories. It is this periodic migration that can use the established bucket range numbers to restripe, or redistribute, the data territories according to changes in the storage system or changes in the access dynamics of the data.

The tiers of a storage system may be established based on factors such as drive rotation speed, head seek latency, drive interface performance, caching, RAID performance, drive capacity, network connection speed, network stack performance, and various other system parameters. For example, a storage system may have higher tiers comprising high-performance SAS (serially attached SCSI) drives, efficient RAID systems, and fast network interconnections. The same storage system may have lower tiers comprising slower SATA (serial advanced technology attachment) drives, slower RAID implementations, or lower performance network interconnections.

Referring now to FIG. 4, a data structure diagram 400 illustrates a pivot table relating buckets and storage tiers within a data storage system. The data structure 400 can store an entry for each tier and bucket pairing. The entry can equal the number of territories currently stored in that tier having an ILM number within the range of the bucket. Each bucket, including bucket zero, can have a value for each tier. For example, the row for tier one shows that 200 territories stored in tier one have ILM values that fit in the range for bucket one. These territories can be considered as properly placed. The same row for tier one also shows that 50 territories are stored in tier one that have ILM values within the range for bucket three. These territories may be candidates for demotion because they are stored in tier one, but may be more appropriately placed in tier three. In the same row for tier zero, 50 territories are shown in bucket zero. This entry accounts for 50 territories within the physical capacity of tier one that are currently free or unallocated. Examining the row for tier three, there are 600 territories shown to be stored in tier three that have ILM statistics within the range for bucket three. These 600 territories can be considered properly placed. In the same row for tier three, there are 700 territories shown to be stored in tier three that have ILM statistics in the range for bucket four. These territories may be candidates for demotion. In contrast, the same row shows 200 territories storied in tier three that have ILM values in the range for bucket two. These 200 territories can be considered candidates for promotion from their current position in tier three into tier two.

An optimally positioned set of data may only have values along the diagonal of the data structure as shown in FIG. 4. That is, all territories in tier N would have ILM values in the range for bucket N for each value of N from one to the number of tiers in the storage system. In such a hypothetical arrangement of data, all other "off diagonal" elements of the data structure would be zero indicating zero improperly located territories requiring migration via promotion or demotion.

Referring now to FIG. 5, a data structure diagram 500 illustrates the number of promotion to be performed for each tier in a data storage system. The number of promotions to be made to a given destination tier can be determined by calculating the minimum of three values. These three values are the number of candidate territories, the number of free territories, and the quota. The number of candidate territories may be determined as the number of territories currently located in tiers lower than the destination tier but having ILM values within the bucket range for the bucket corresponding to the destination tier. The number of free territories can be determined from the number of bucket zero territories within the destination tier. The quota can be an indicator of the maximum number of territories that can be moved. The quota can be supplied by a workflow module and may have been determined by the amount of available system resources within the storage system.

When a number of promotions to a tier have been determined, that number can be decremented from the bucket zero quantity in the pivot table 400 for that tier. Also, the quota can be decremented by the same number. These adjustments are made because the promotion to the destination tier can lower the amount of free spaces in the destination tier, and the promotion data migration moves can lower the number of remaining migration moves allowed by the quota. Since each determination of promotions may lower the migration quota, the number of promotions to the highest performing tier, for example tier one, can be determined first followed by tier two and so on. Once the quota is decremented to zero, it will always be the lowest of the three values to be minimized so all subsequent promotion quantities will be determined to be zero.

As an example of calculating the number of promotions to be made to each tier, the example data from pivot table 400 can be used. The three numbers to minimize amongst must be determined. First, the number of candidates can be determined by adding up all the bucket one territories current in tiers lower than tier one. These values are in the bucket one column of the pivot table 400. Ignoring the first value of 200 because these territories are already in tier one and do not need to be promoted, the remaining four values are 100 from tier two, 50 from tier three, 20 from tier four, and 30 from tier five. The sum of these four values is 200 so the first of the three values to minimize is 200. The number of free territories can be determined from the number of bucket zero territories within tier one. Examining the pivot table 400, it is determined that there are 50 territories free in tier one and thus the second of the three numbers to minimize is 50. The third number to minimize can be taken in this example to be a quota of 1000 as might be provided by a workflow module. The minimum of 200, 50 and 100 is 50, so the value of 50 is registered into the promotion table 500 for tier one.

The bucket zero entry for tier one in the pivot table 400 can now be reduced by 50 to zero, and the quota can also be reduced by 50 to 950. The number of territories to be promoted to the remaining tiers can be determined similarly. However, no promotions are determined to the lowest tier (tier five in the example) because there are no lower tiers from which territories could be promoted. A single promotion number can be calculated for each destination tier. This single number can include all promotions from lower tiers summed together. When the migrations are scheduled, the ILM statistic values of each candidate tier can determine how many of the promotions come from each of the other tiers by migrating the highest ILM value territories first.

Figure 6:
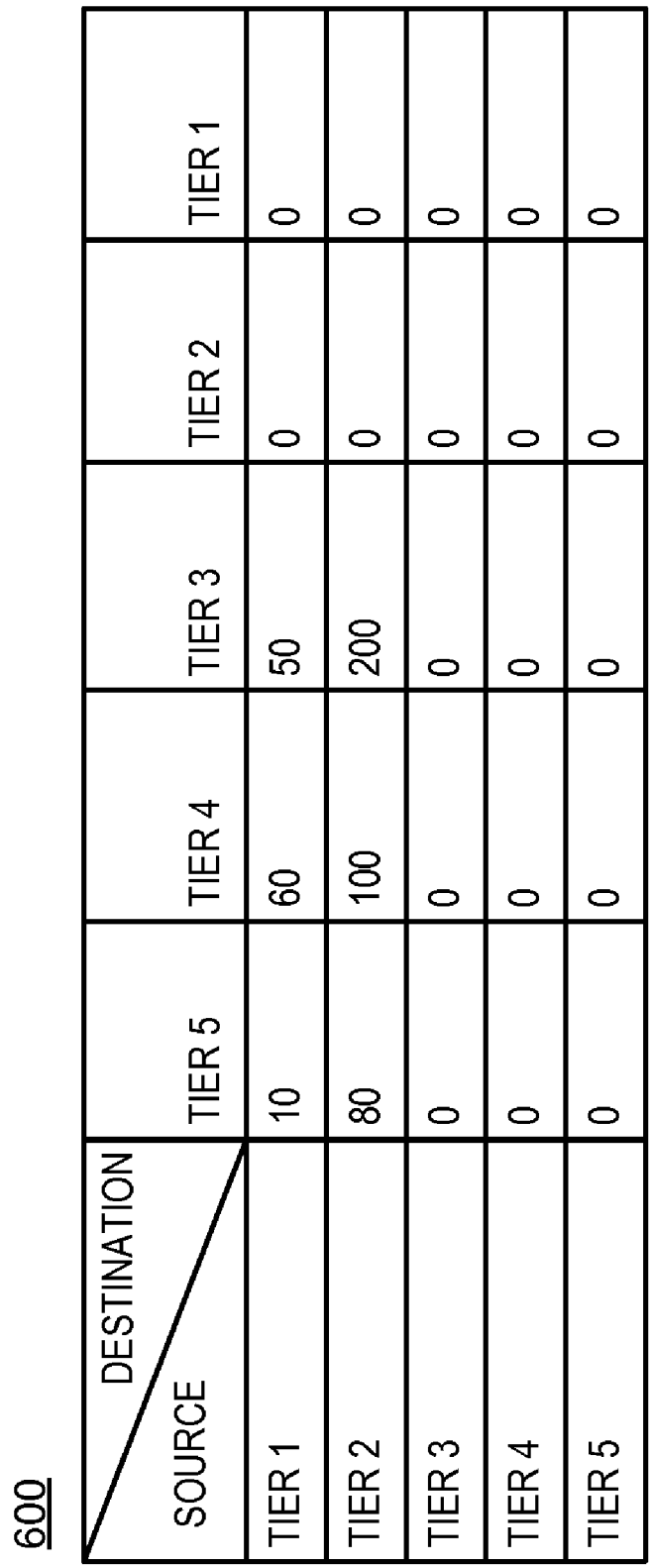
FIG. 6 is a data structure diagram illustrating the number of demotions to be performed from each tier into each other tier of a data storage system according to one exemplary embodiment.

Referring now to FIG. 6, a data structure diagram 600 illustrates the number of demotions to be performed from each tier to each other tier in a data storage system. For each destination tier, the demotion table 600 shows how many territories are to be demoted to the destination tier from each other tier. Since demotions may not be made from lower performing tiers to higher performing tiers, the demotion table 600 can have zeros in the lower triangle of the table.

Each tier can be evaluated to determine if the tier is filled over its nominal limit into its slack space. The slack space can be 10% for example, or any other specified percentage or fixed value for each tier. If the amount of specified slack space is still free, then there is no need to demote from that tier. If demotions are to be made, then for each pair of source and destination tiers, the number of territories to demote is decided as the minimum of the following three values. These three values are the quota, the number of free territories in the destination tier, and the number of candidate territories. The candidate tiers can be those that reside in the source tier but have ILM values that fall in the bucket corresponding to the destination tier.

The process can be applied starting with the highest performance tier as the source (and working down through the source tiers from there) and starting from the lowest performance tier as the destination (and working up in the destination tiers from there). For example, in the illustrated system with five tiers, the sources can be iterated starting from tier one and continuing to tier four, while the destinations can be iterated starting from tier five and continuing to tier two. This progression can allow for the highest priority demotions to be given to the lowest frequency or oldest data on a particular tier.

To decide how many territories will be demoted from tier to tier in the illustrated example, first the quota is established. Prior to the promotions discussed above, the quote was 1000, however there were 500 promotions scheduled as determined by summing the numbers in the column of table 500. Reducing the original quota by the 500 promotions leaves a quota of 500 for demotions. The first demotions to calculate are from tier one to tier five. It can first be determined if tier one has less than 10% slack space free. Since the tier one bucket zero entry in the pivot table 400 was reduced by 50 after the promotions, there is less than 10% free territories in tier one. Now the three values to minimize are determined. The quota is 500, the number of free candidates in tier five is 700, and the number of candidate territories in tier one that have ILM statistic in the bucket five range is 10. The minimum of 500, 700, and 10 is 10, so 10 is assigned to the demotion table 600 as the number of territories to demote from tier one into tier five. This is continued for all source and destination pairs or until the quota has run out. For example, the demotion table 600 shows the demotion numbers as zero for source tiers three and four because the quota has run out after allocated demotions from source tiers one and two. The demotion number is zero for source tier one to destination tier two because tier two does not have any free territories.

Figure 7:
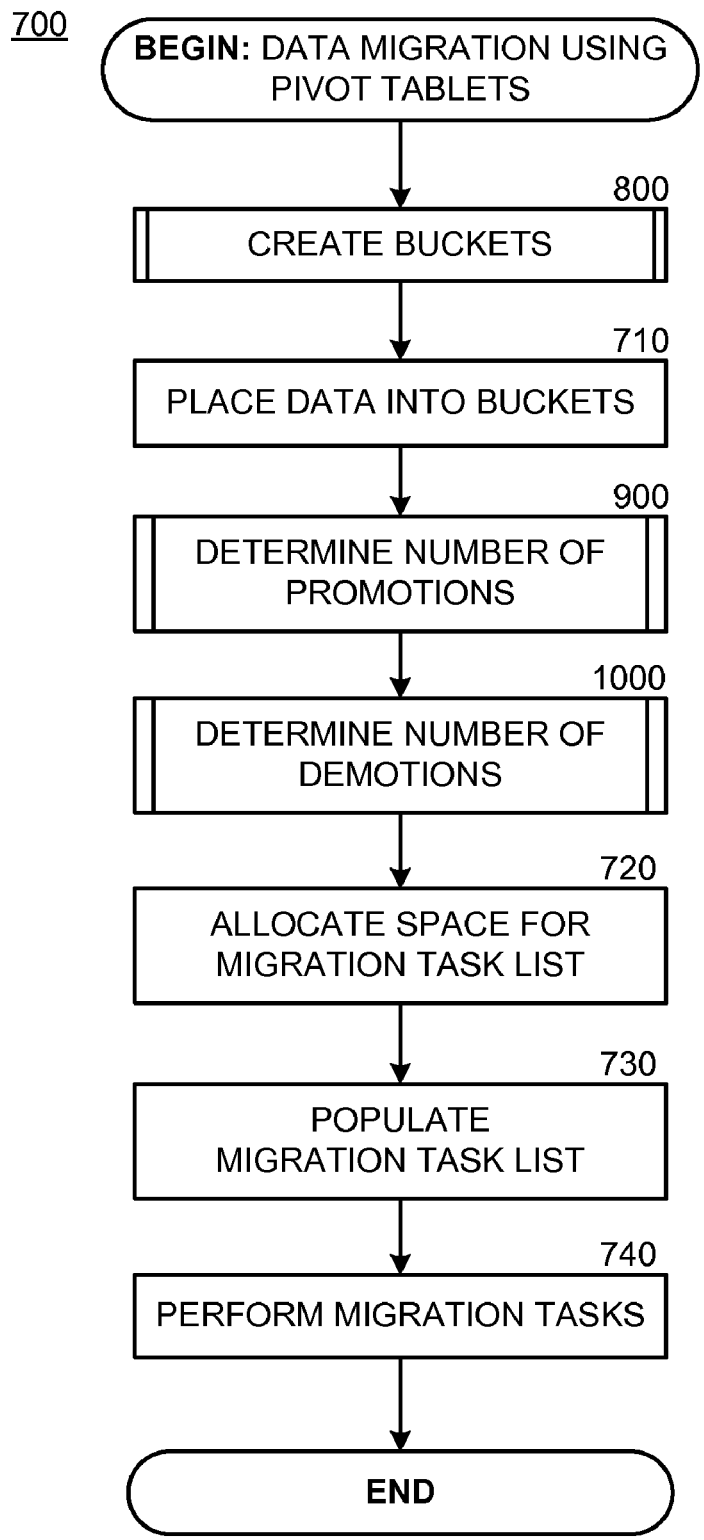
FIG. 7 is a logical flow diagram illustrating a process performed by a storage system for migrating data between storage tiers according to one exemplary embodiment.

Turning now to FIG. 7, additional details will be provided regarding the embodiments presented herein for data migration in a multitier storage system using pivot tables. In particular, FIG. 7 is a flow diagram showing a routine 700 that illustrates aspects of an exemplary process performed by a storage system for migrating data between storage tiers. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 700 can begin with operation 800 where a subroutine is called to create buckets associated with the storage tiers of the system. Additional details on the creation of buckets are discussed with respect to FIG. 8. At operation 710 the territories belonging in each bucket can be determined. A pivot table 400 can be populated with the number of territories stored within each tier that have ILM statistics within the range for each bucket. At operation 900, a subroutine can be used to determine the number of promotions. The pivot table 400 can be examined to determine the number of promotions that can be made into each tier from lower tiers. A promotion table 500 can be populated. The determination of promotions is discussed in additional detail with respect to FIG. 9. At operation 1000, a subroutine can be used to determine the number of demotions. The pivot table 400 can be examined to determine the number of demotions that can be made from each tier into each lower tier. A demotion table 600 can be populated. The determination of demotions is discussed in additional detail with respect to FIG. 10.

At operation 720, space can be allocated for migration task lists. The lists can be created as promotion and demotion task lists. The total number of migration tasks for promotion and for demotion may be the sum of those determined in operations 900 and 1000 respectively. These numbers determine the amount of space allocated for the lists. An array, linked list, or other data structure, can be set up to hold each list of data migration tasks.

At operation 730, the data migration tasks can be populated into the space allocated at operation 720. These tasks can be determined in a single iteration through all of the territories in the storage system. Unallocated territories can be skipped. For populated territories, the current tier is determined and the bucket for the territory can be determined from the ILM statistic of the territory. If the current tier and bucket are equal, no migration is necessary, and the territory is passed over. If the tier is a higher performance tier than the tier associated with the bucket, the territory is a candidate for demotion. If the tier is lower performance tier than the tier associated with the bucket, the territory is a candidate for promotion. Territories that are candidates for promotion or demotion can be placed into the appropriate migration task list. The migration task lists can be maintained in a sorted order by the ILM metric value of the territory. The sorting order can be descending for the promotion candidates and ascending for the demotion candidates. The sort order of the lists can be maintained by inserting tasks into the list in order and also, once the list is full, discarding the least appropriate of either the new task or the bottom task already in the list.

At operation 740, the data migration tasks that have been placed into the migration task lists can be queued for execution. As each task is executed in turn, the desired data migration can be carried out by relocating the data from the source territory into a territory in the destination tier. The routine 700 can terminate after operation 740.

Figure 8:
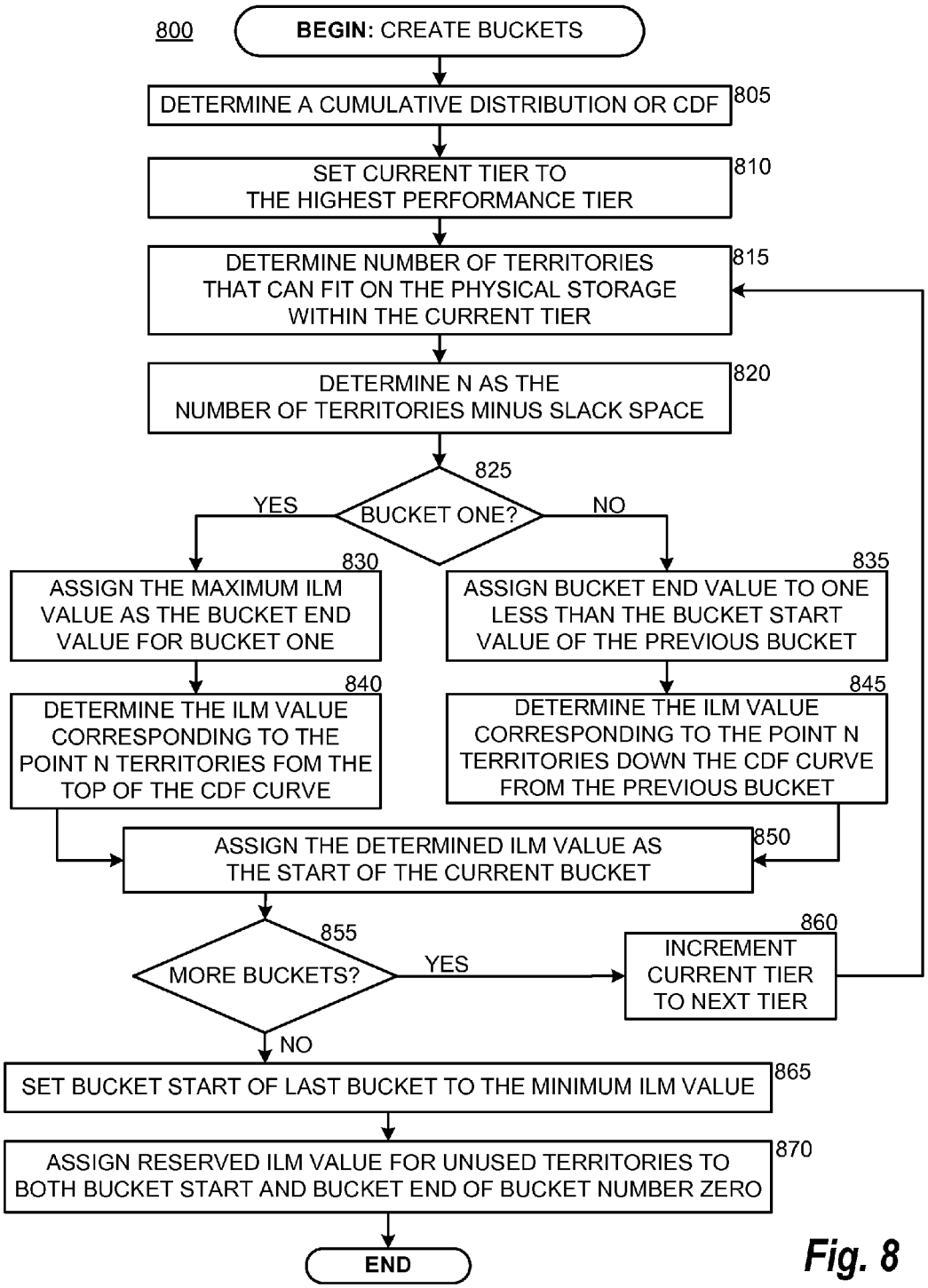
FIG. 8 is a logical flow diagram illustrating a process performed by a storage system for creating bucket ranges according to one exemplary embodiment.

Turning now to FIG. 8, additional details will be provided regarding the embodiments presented herein for data migration in a multitier storage system using pivot tables. In particular, FIG. 8 is a flow diagram illustrating a routine 800 that shows aspects of an exemplary process performed by a storage system for creating bucket ranges. The routine 800 can begin with operation 805 where a cumulative distribution function (CDF) is established over the ILM statistic values for all of the territories in the storage system. At operation 810 the iteration through all of the tiers is initialized by setting the current tier to the highest performance tier. The highest performance tier may be tier one. At operation 815 the number of territories that can fit within the physical storage of the current tier is established. This can include adding up the capacity of all of the physical storage devices in the current tier and dividing by the territory size. At operation 820 the value "N" is established as the number of territories determined in operation 815 minus slack space. The slack space can be 10% of the capacity of the tier, or a fixed value or any other percentage or fixed value according to embodiments. The capacity aside from the slack space is the space within the tier for storing active territories. This maximum number of active territories (after slack space) can be represented by the number "N".

At operation 825 it can be determined if the routine 800 is current establishing the first bucket range. This is determined because the first bucket may be handled differently as a boundary condition. If it is determined by operation 825 that bucket one is the current bucket, the routine 800 can continue to operation 830. At operation 830, the bucket end value for bucket one is assigned the maximum ILM value. The end value for bucket one defaults to the maximum ILM value because the first bucket can capture the territories with the highest ILM values. At operation 840, the ILM value corresponding to a point that is "N" territories from the top of the CDF curve is determined. There can be exactly "N" territories with ILM values equal to or greater than this ILM value, so this ILM value can be used as the lower extent of bucket one. If instead, operation 825 determines that the current bucket is not bucket one, the routine 800 can continue to operation 835. At operation 835, the bucket end value can be assigned to be one less than the bucket start value of the previous bucket. Assigning each of the buckets (after the first bucket) to end at the ILM value one less than the start of the previous bucket can ensure that all of the buckets taken together span the range of ILM values without gaps. At operation 845 the ILM value corresponding to the point "N" territories down the CDF from the point of the previous bucket can be determined. There can be exactly "N" territories with ILM values equal to or greater than this ILM value but less than the bucket start of the previous bucket. Thus, this ILM value can be used as the lower extent of the current bucket. At operation 850, the value determined in operation 840 or 845 can be assigned as the start of the current bucket.

At operation 855 it is determined if there are more buckets to iterate through. If it is determined that there are additional buckets, the routine 800 can continue to operation 860 where the current tier can be incremented to the next tier and correspondingly the current bucket can be incremented to the next bucket. From operation 860, the routine 800 can loop back to operation 815 to process the next tier. If instead, it is determined at operation 855 that there are no additional buckets, and all tiers have been iterated, the routine 800 can continue to operation 865. At operation 865, the bucket start value of the last bucket can be set the lowest possible ILM value. Doing so can ensure that the range of all of the buckets taken together covers the full range of ILM values. At operation 870 both the bucket start value and the bucket end value of bucket zero can be set to the ILM value reserved for unused territories. This can be done to set up bucket zero to account for all unused territories.

Figure 9:
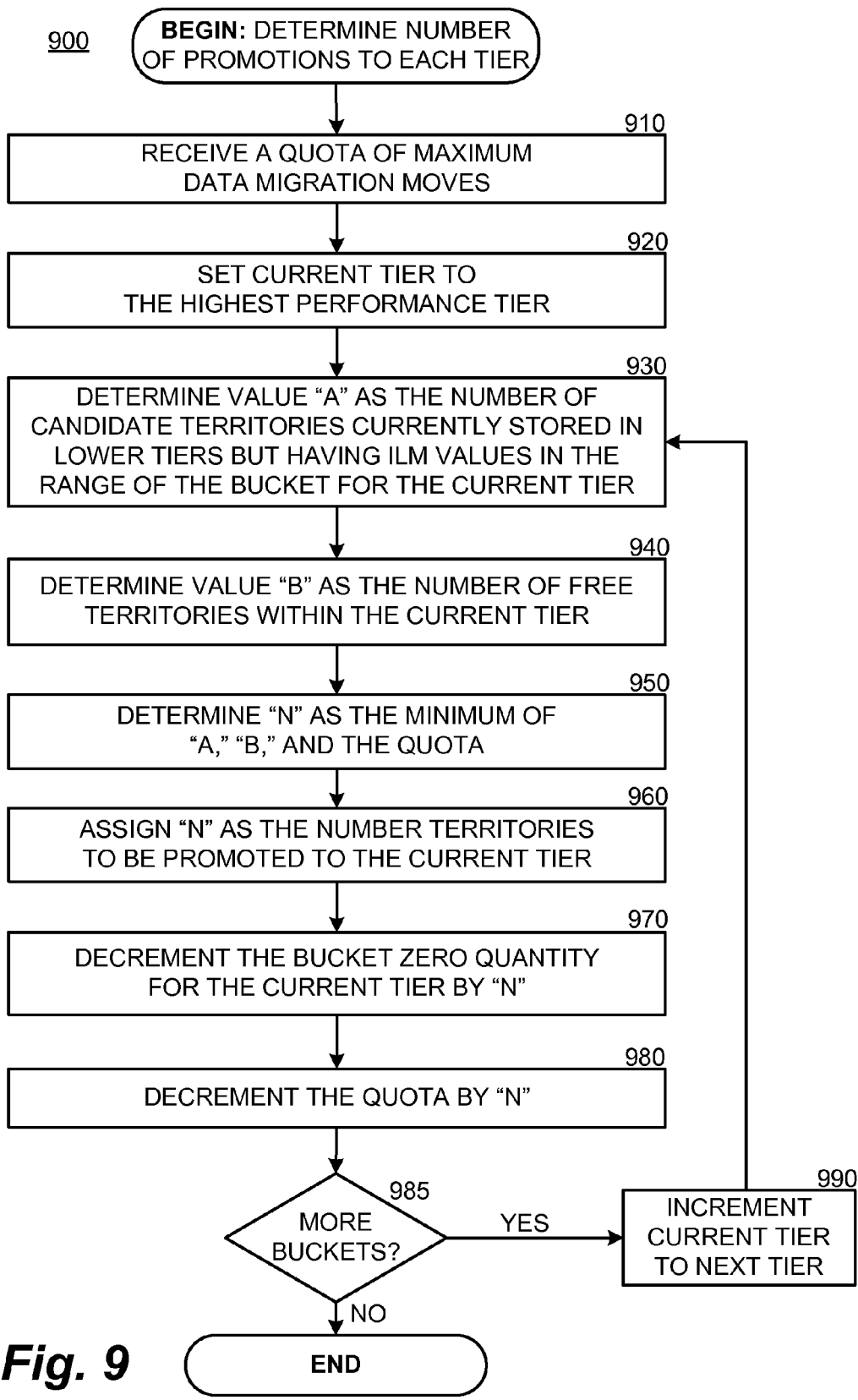
FIG. 9 is a logical flow diagram illustrating a process performed by a storage system for determining the number of promotions to make into each tier according to one exemplary embodiment.

Turning now to FIG. 9, additional details will be provided regarding the embodiments presented herein for data migration in a multitier storage system using pivot tables. In particular, FIG. 9 is a flow diagram illustrating a routine 900 that shows aspects of an exemplary process performed by a multitier storage system for determining the number of promotions to make to each tier. The routine 900 can begin with operation 910 where a quota of maximum data migration moves to be performed is received from a scheduling or workflow management module of the storage system. Alternatively, the quota can be a fixed value or a function of the time of day, day of the week, or other quantity. At operation 920, iteration through the tiers can be initialized by setting the current tier to the highest performance tier. For example, the highest performance tier may be tier one.

At operation 930, a value "A" can be determined as the number of candidate territories for promotion to the current tier. Candidates for promotion can be territories that are currently stored in lower tiers but have ILM values in the rage of the bucket for the current tier. At operation 940, a value "B" can be determined as the number of free territories within the current tier. The free territories can have an ILM value equal to the reserved value for unallocated tiers. These can be the tiers of bucket zero. At operation 950, a value "N" can be calculated by taking the minimum of "A," "B," and the quota. At operation 960, this minimum value "N" can be assigned within the promotion table 500 as the number of territories to be promoted into the current tier.

At operation 970, the value in the pivot table 400 for the bucket zero quantity within the current tier can be decremented by "N". This can be done to account for the loss of free territories in the current tier equal in number to the territories that will be migrated into the current tier by promotion. At operation 980, the migration quota can be decremented by "N" also. This can be done to account for the number of migrations that will be consumed from the quota to promote the "N" territories into the current tier.

At operation 985 it can be determined if there are more buckets to iterate through. If it is determined that there are additional buckets, the routine 900 can continue to operation 990 where the current tier can be incremented to the next tier and correspondingly the current bucket can be incremented to the next bucket. From operation 990, the routine 900 can loop back to operation 930 to process the next tier. If instead, it is determined at operation 985 that there are no additional buckets and all tiers have been iterated, the routine 900 can terminate.

Figure 10:
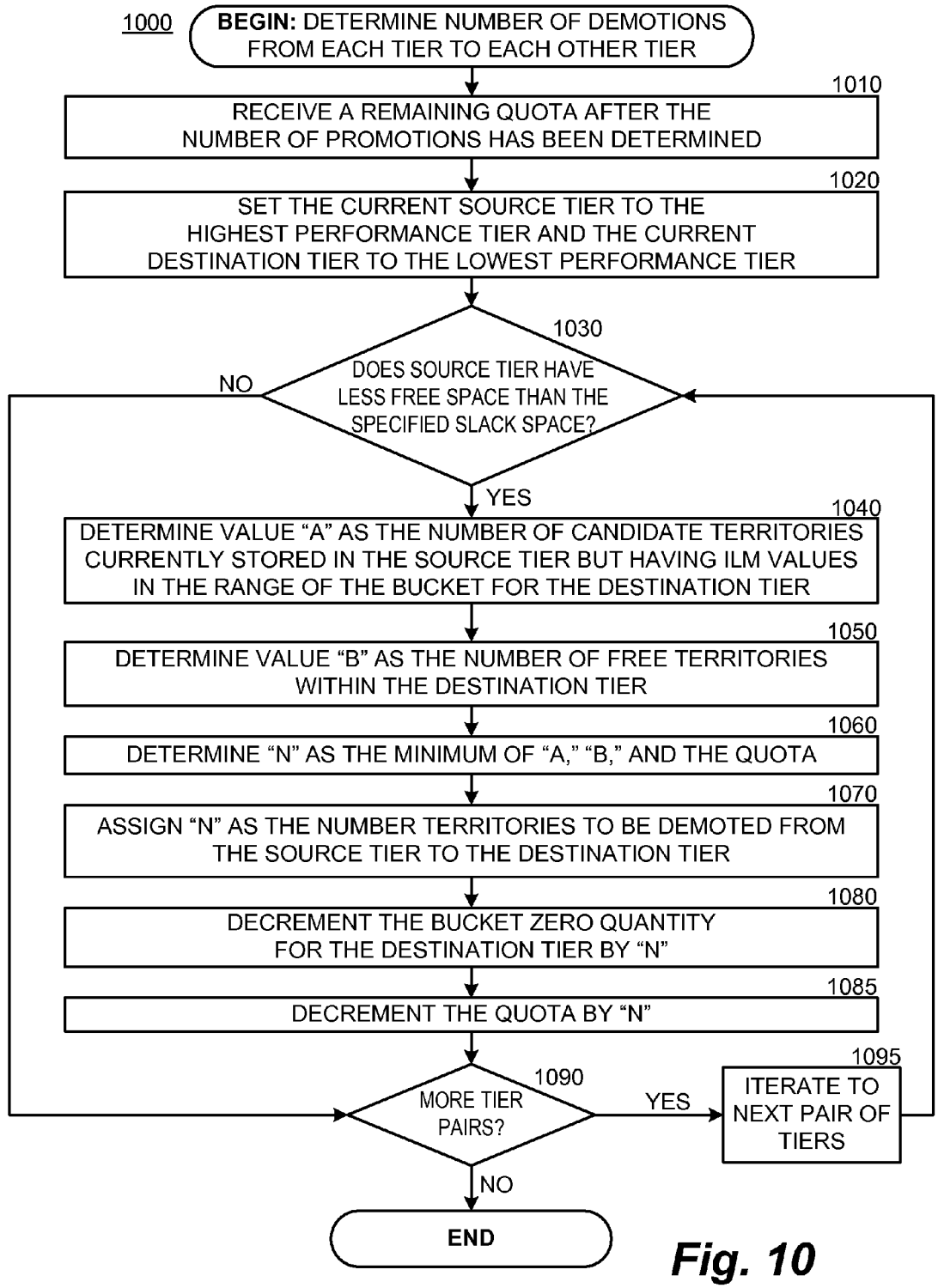
FIG. 10 is a logical flow diagram illustrating a process performed by a storage system for determining the number of demotions to make from each tier into each other tier according to one exemplary embodiment.

Turning now to FIG. 10, additional details will be provided regarding the embodiments presented herein for data migration in a multitier storage system using pivot tables. In particular, FIG. 10 is a flow diagram illustrating a routine 1000 that shows aspects of an exemplary process performed by a multitier storage system for determining the number of demotions to make from each tier to each other tier. The routine 1000 can begin with operation 1010 where a remaining quota can be received or retrieved. The remaining quota can be the number of data migrations that are left of the quota after the number of promotions has been determined by routine 900. These remaining data migration cycles can be allocated to the demotion of territories by routine 1000.

At operation 1020 a pair-wise iteration through all of the tiers can be initialized by setting the current source tier to the highest performance tier and the current destination tier to the lowest performance tier. At operation 1030, it can be determined if the source tier has less free space than the specified slack space. If so, then space can be freed by demoting territories from the source tier, otherwise there is no need to force the demotion of any territories. Thus, if it is determined at operation 1030 that there is not a shortage of free space in the source tier, the routine 1000 can continue to operation 1090. If instead, there is less free space than specified by the slack space requirement, demotions can be determined starting with the progression of the routine 1000 to operation 1040.

At operation 1040, a value "A" can be determined as the number of candidate territories. These candidate territories may be currently stored in the source tier but have ILM values in the range of the bucket for the destination tier. At operation 1050, a value "B" can be determined as the number of free territories within the destination tier. The number of free territories can be determined from the pivot table 400 as the number of territories in the zero bucket for the destination tier. At operation 1060, a value "N" can be calculated by finding the minimum of three values. These three values are "A," "B," and the remaining quota limiting the number of migrations. At operation 1070, the value "N" may be assigned into the demotion table 600 as the number territories to be demoted from the source tier to the destination tier.

At operation 1080, the value in the pivot table 400 for the bucket zero quantity within the destination tier can be decremented by "N". This can be done to account for the loss of free territories in the destination tier equal in number to the territories that will be migrated into the destination tier by demotion. At operation 1085, the migration quota can be decremented by "N" also. This can be done to account for the number of migrations that will be consumed from the quota to demote the "N' territories from the source tier into the destination tier.

At operation 1090 it can be determined if there are more tier pairs to iterate through. If it is determined that there are additional pairs, the routine 1000 can continue to operation 1095 where the source tier and the destination tier can be incremented to the next pair of tiers. From operation 1095, the routine 1000 can loop back top operation 1030 to process the next pair of tiers. If instead, it is determined at operation 1090 that there are no additional pairs of tiers, the routine 1000 can terminate.

Figure 11:
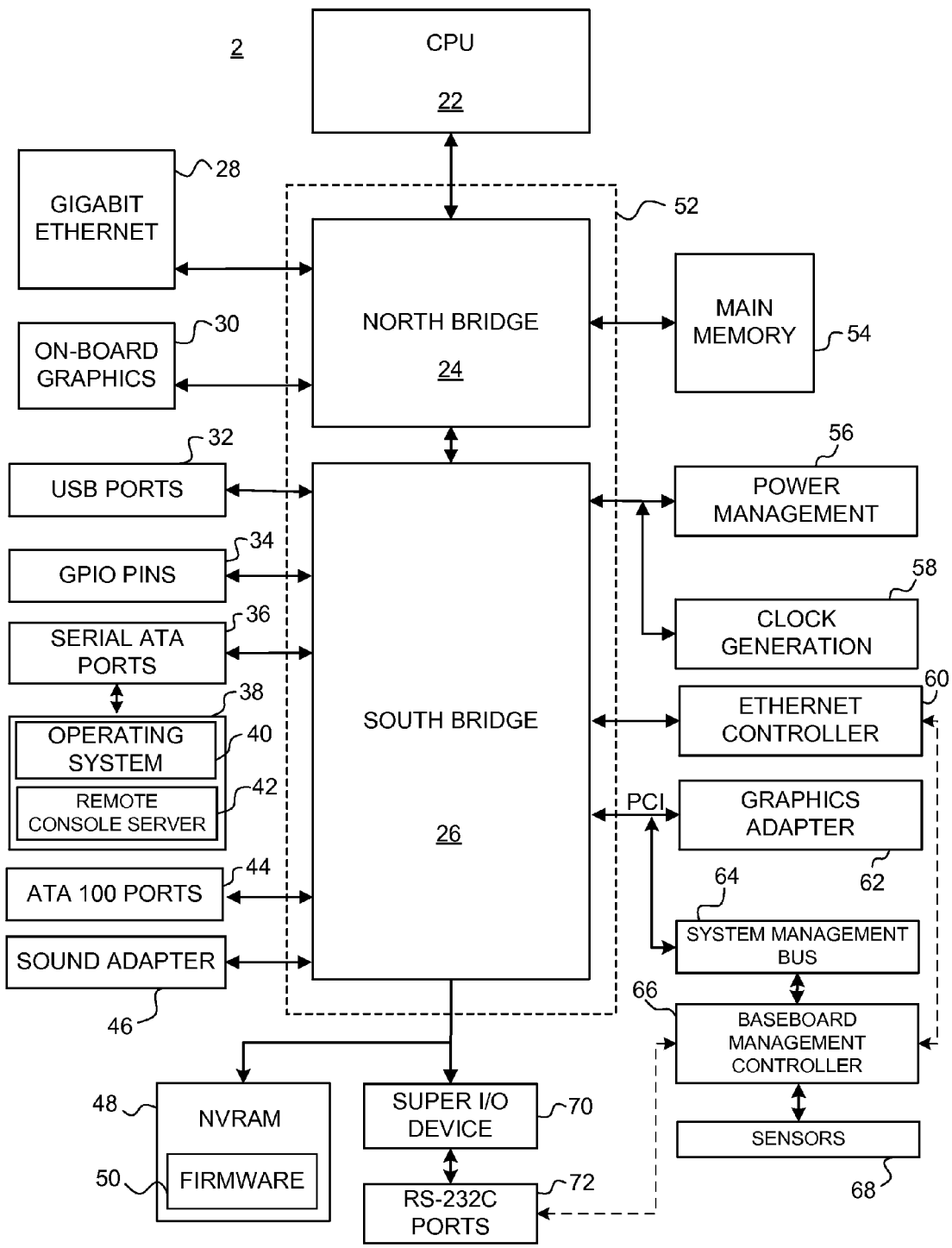
FIG. 11 is a computer architecture diagram illustrating a computer hardware architecture for a computing system capable of serving as a storage node according to one exemplary embodiment.

FIG. 11 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 11 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 11, may include other components that are not explicitly shown in FIG. 11, or may utilize an architecture completely different than that shown in FIG. 11.

Based on the foregoing, it should be appreciated that technologies for implementing a migration mechanism in a storage system containing multiple tiers and using pivot tables to determine promotions and demotions are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for migrating data between tiers of a storage system, the method comprising:
   subdividing a storage capacity of the storage system into a set of territories;
   partitioning the set of territories into tiers;
   partitioning a range of information lifecycle management metrics into buckets, each bucket corresponding to one of the tiers;
   maintaining a data structure relating the buckets and the tiers, the data structure containing an entry for each relationship of a bucket and a tier that is a number of territories currently stored in the tier having an information lifecycle management number within the range of the bucket, wherein the entry corresponds to a count of territories stored in the tier and having a lifecycle management metric within the bucket; and
   moving a territory from a current tier to destination tier in response to the information lifecycle management metric associated with the territory being within the bucket associated with the destination tier.

2. The method of claim 1, wherein moving a tier comprises promoting a territory from a lower tier to a higher tier in response to the information lifecycle management metric associated with the territory being within the bucket associated with the higher tier.

3. The method of claim 1, wherein moving a tier comprises demoting a territory from a higher tier to a lower tier in response to the information lifecycle management metric associated with the territory being within the bucket associated with the lower tier.

4. The method of claim 1, further comprising assigning each bucket and each tier a value in a hierarchical order, wherein territories in a bucket and a tier having a same value are considered to be properly placed.

5. The method of claim 4, wherein territories in a bucket and a tier having a different value are considered to be candidates for moving.

6. The method of claim 1, wherein partitioning the range of all possible information lifecycle management metrics comprises establishing a partition based on a physical capacity of each tier, and a cumulative statistical distribution of territories with respect to information lifecycle management metrics.

7. The method of claim 6, wherein partitioning the range of all possible information lifecycle management metrics comprises providing slack space within each tier to be used during data migrations.

8. A method for migrating data between tiers of a storage system, the method comprising:
   subdividing a storage capacity of the storage system into a set of territories;
   partitioning the set of territories into tiers;
   partitioning a range of information lifecycle management metrics into buckets, each bucket corresponding to one of the tiers;
   maintaining a data structure relating the buckets and the tiers, the data structure containing an entry for each relationship of a bucket and a tier that is a number of territories currently stored in the tier having an information lifecycle management number within the range of the bucket; and
   moving a territory from a current tier to destination tier in response to the information lifecycle management metric associated with the territory being within the bucket associated with the destination tier, wherein maintaining an information lifecycle management metric comprises combining an age statistic and a frequency statistic into a single metric.

9. A computer storage medium having computer-executable instructions stored thereon which, when executed by a computer system, cause the computer system to:
   subdivide a storage capacity of a storage system into a set of territories;
   partition the set of territories into tiers;
   partition a range of information lifecycle management metrics into buckets, each bucket corresponding to one of the tiers;
   maintain a data structure relating the buckets and the tiers, the data structure containing an entry for each relationship of a bucket and a tier that is a number of territories currently stored in the tier having an information lifecycle management number within the range of the bucket;
   move a territory from a current tier to destination tier in response to the information lifecycle management metric associated with the territory being within the bucket associated with the destination tier;
   promote a territory from a lower tier to a higher tier in response to the information lifecycle management metric associated with the territory being within the bucket associated with the higher tier; and
   determine how many territories to promote into a destination tier based upon a count of territories in all lower tiers having a lifecycle management metric within the bucket corresponding to the destination tier.

10. The computer storage medium of claim 9, wherein partitioning the range of all possible information lifecycle management metrics comprises providing a periodic timer for updating the partitioning.

11. The computer storage medium of claim 9, wherein partitioning the range of all possible information lifecycle management metrics comprises establishing a partition based on a physical capacity of each tier, and a cumulative statistical distribution of territories with respect to information lifecycle management metrics.

12. A computer storage medium having computer-executable instructions stored thereon which, when executed by a computer system, cause the computer system to:
subdivide a storage capacity of a storage system into a set of territories;
partition the set of territories into tiers;
partition a range of information lifecycle management metrics into buckets, each bucket corresponding to one of the tiers;
maintain a data structure relating the buckets and the tiers, the data structure containing an entry for each relationship of a bucket and a tier that is a number of territories currently stored in the tier having an information lifecycle management number within the range of the bucket;
move a territory from a current tier to destination tier in response to the information lifecycle management metric associated with the territory being within the bucket associated with the destination tier;
demote a territory from a higher tier to a lower tier in response to the information lifecycle management metric associated with the territory being within the bucket associated with the lower tier; and
determine how many territories to demote from a source tier into a destination tier based upon a count of territories in the source tier having a lifecycle management metric within the bucket corresponding to the destination tier.

13. A computer storage medium having computer-executable instructions stored thereon which, when executed by a computer system, cause the computer system to:
subdivide a storage capacity of a storage system into a set of territories;
partition the set of territories into tiers;
partition a range of information lifecycle management metrics into buckets, each bucket corresponding to one of the tiers;
maintain a data structure relating the buckets and the tiers, the data structure containing an entry for each relationship of a bucket and a tier that is a number of territories currently stored in the tier having an information lifecycle management number within the range of the bucket; and
move a territory from a current tier to destination tier in response to the information lifecycle management metric associated with the territory being within the bucket associated with the destination tier, wherein maintaining an information lifecycle management metric comprises combining an age statistic and a frequency statistic into a single metric.

14. A data storage system comprising:
a storage subsystem;
a plurality of physical storage devices associated with the storage subsystem; and
one or more data migration modules operable to cause the storage subsystem to:
subdivide a storage capacity of the storage system into a set of territories;
partition the set of territories into tiers;
partition a range of information lifecycle management metrics into buckets, each bucket corresponding to one of the tiers;
maintain a data structure relating the buckets and the tiers, the data structure containing an entry for each relationship of a bucket and a tier that is a number of territories currently stored in the tier having an information lifecycle management number within the range of the bucket, wherein the entry corresponds to a count of territories stored in the tier and having a lifecycle management metric within the bucket; and
move a territory from a current tier to destination tier in response to the information lifecycle management metric associated with the territory being within the bucket associated with the destination tier.

15. The data storage system of claim 14, wherein the data migration modules are further operable to cause the storage subsystem to promote a territory from a lower tier to a higher tier in response to the information lifecycle management metric associated with the territory being within the bucket associated with the higher tier.

16. The data storage system of claim 14, wherein the data migration modules are further operable to cause the storage subsystem to demote a territory from a higher tier to a lower tier in response to the information lifecycle management metric associated with the territory being within the bucket associated with the lower tier.

* * * * *